United States Patent Office 3,333,544
Patented Aug. 1, 1967

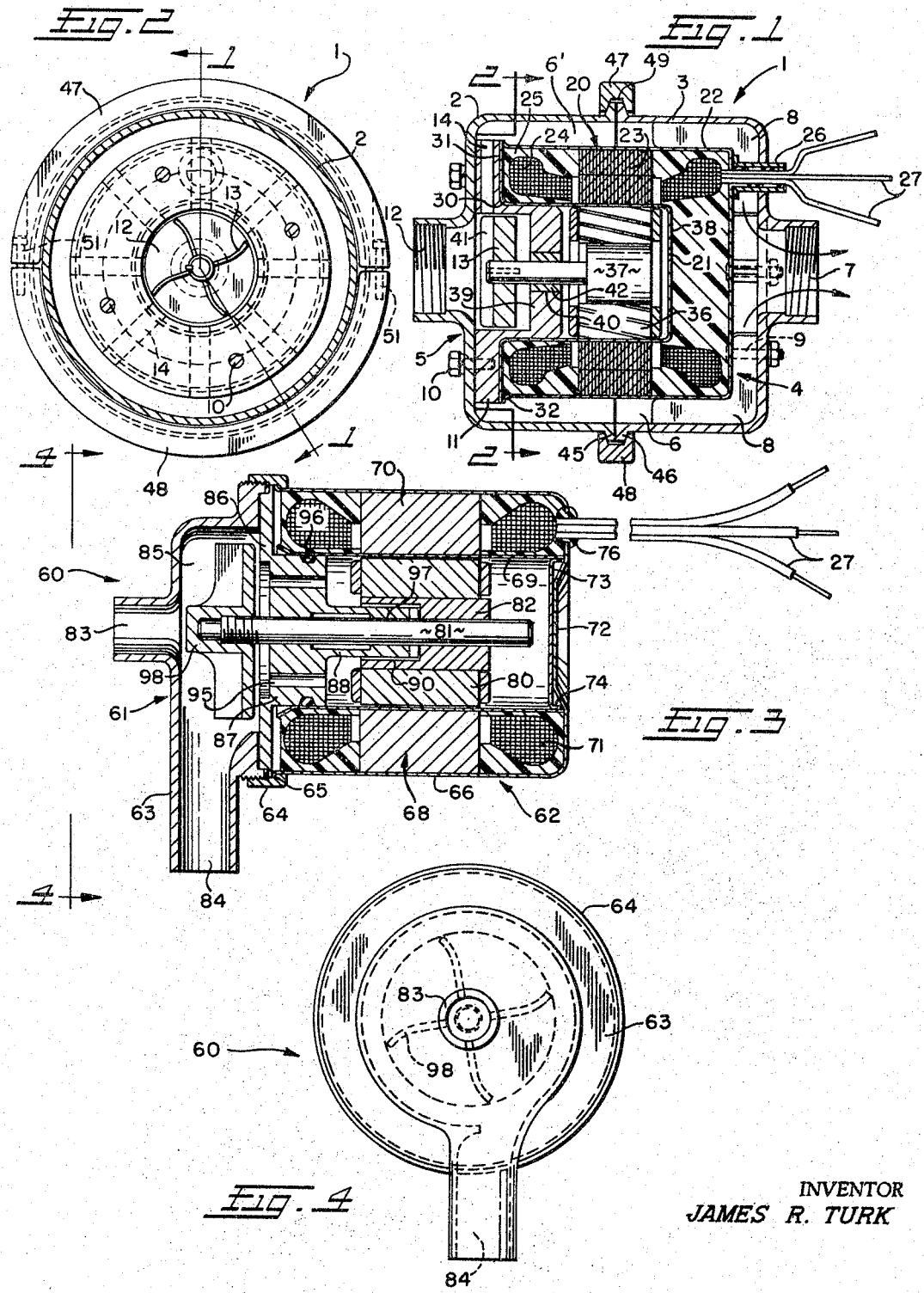

3,333,544
WATER PUMP MOTOR CONSTRUCTIONS
James R. Turk, Solon, Ohio, assignor to
Vincent K. Smith, Gates Mills, Ohio
Filed Mar. 22, 1965, Ser. No. 441,632
8 Claims. (Cl. 103—87)

The present invention relates generally, as indicated, to improved water pump motor constructions and, more particularly, to improved pump motor combinations in which the pump and motor are clamped together by a simple clamping ring, thereby permitting easy removal of the motor in case of failure without disturbing the pump connections.

Heretofore, motors and pumps were generally manufactured as separate units and were operatively connected together by means of a coupling. Such a coupling may be eliminated by clamping the motor housing directly to the pump housing and providing the motor with an extra long shaft which is adapted to extend into the pump housing for supporting the pump impeller. Such a pump motor construction has fewer parts and thus is less expensive to manufacture than previously known pump motor constructions. However, if the motor fails, it is still somewhat of a problem to replace, especially without disturbing the rigid plumbing involved.

It is therefore a principal object of this invention to provide a novel water pump motor construction the motor of which may easily be removed in case of failure without disturbing the various connections to the pump.

Another object is to provide such a water pump motor combination with a simple clamping ring for releasablly clamping the pump and motor together, such clamping ring being especially suited for drawing the pump and motor housings into fluid tight engagement.

A further object is to eliminate the common rotating shaft seal which is normally provided between the motor and pump of such a combination.

Still another object is to provide a motor for pump motor combinations of the type discussed above which has very few operating parts, thereby making the unit cost sufficiently low such that the motor can be thrown away when it fails and replaced by another and without difficulty.

Other objects and advantages of the present invention will become apparent as the following description proceeds.

To the accomplishment of the foregoing and related ends the invention, then, comprises the features hereinafter fully discussed and particularly pointed out in the claims, the following description and the annexed drawing setting forth in detail certain illustrative embodiments of the invention, these being indicative, however, of but several of the various ways in which the principle of the invention may be employed.

In said annexed drawing:

FIG. 1 is a substantially vertical longitudinal section of a preferred form of pump motor construction in accordance with the present invention taken on the plane of the line 1—1 of FIG. 2;

FIG. 2 is a transverse vertical section taken on the plane of the line 2—2 of FIG. 1;

FIG. 3 is a longitudinal section of another form of pump and motor construction in accordance with the present invention; and FIG. 4 is an end elevation of the pump motor construction of FIG. 3 as viewed from the left end thereof.

Turning now to the drawing, and first of all to FIGS. 1 and 2, the preferred form of pump and motor combination of the present invention is generally indicated at 1 and comprises a two-part housing 2 and 3 in which there is disposed an induction or other type motor 4 and a centrifugal pump 5. The induction motor 4 is concentrically disposed within the housing part 3 in spaced relation thereto to define an annular fluid chamber 6 through which the fluid discharge from the pump 5 is permitted to pass to the fluid outlet 7 of the housing part 3, as will be more fully explained hereafter. The induction motor 4 may be held in such concentric spaced relation by any suitable means, such as by a plurality of circumferentially spaced ribs 8 projecting radially inwardly from the inner surface of the housing part 3 and a plurality of stud bolts 9 projecting from the motor 4 through aligned apertures in the ribs 8 and housing part 3.

The centrifugal pump 5 is also concentrically disposed within its housing part 2 to define a fluid chamber 6' similar to fluid chamber 6 and in communication therewith, such pump 5 being held in position by any suitable means, such as fasteners 10 extending through apertures in the housing part 2 and threadedly engaging apertures in the pump body 11. The housing part 2 is provided with a fluid inlet 12 through which water or other such fluid is adapted to be drawn into the pump 5 by the pump impeller 13, after which the fluid is pumped under pressure through circumferentially spaced, radially extending passageways 14 in the pump body 11 into the annular chambers 6' and 6 surrounding the pump 5 and motor 4, respectively, and out the fluid outlet 7.

Since the motor 4 is entirely immersed in water when fluid is being pumped through the annular chamber 6' by the pump 5, the stator assembly 20 of the pump must be sufficiently sealed to prevent any moisture from coming into contact therewith. In the preferred form shown in FIG. 1, the stator assembly 20 is hermetically sealed by surrounding the stator assembly with cup-shaped inner and outer liners 21 and 22 of stainless steel or like corrosion-resisting material and filling the entire space between the inner and outer liners 21 and 22 not taken up by the stator laminations 23 and stator windings 24 with an epoxy casting resin 25 having excellent strength, chemical resistance, water resistance, and heat stability. Preferably, the epoxy 25 is a resin bonded sand. Extending outwardly from the bottom of the outer liner 22 and through the adjacent wall of the housing part 3 there is a brass lead protector 26 for receipt of the stator winding leads 27, such leads 27 being adapted to be connected to a suitable power source, not shown.

The lip 30 of the inner liner 21 has a radially outwardly extending flange 31, the outer diameter of which is equal to the diameter of the lip 32 of the outer liner 22, whereby the flange 31 of the inner liner 21 may be fusion welded to the lip 32 of the outer liner 27 further to ensure against moisture leaking into the stator assembly 20 and causing damage thereto.

Within the cylindrical opening 35 formed by the inner liner 21 there is disposed the rotor 36 and rotor shaft 37 with the axially inner ends of such rotor and rotor shaft being located adjacent the base 38 of the liner 21. Also disposed within the cylindrical opening 35 adjacent the lip 30 of the inner liner 21 is a reduced diameter end portion 39 of the pump body 11, such end portion 39 having a diameter substantially equal to or slightly less than the diameter of the inner liner 21 for sliding engagement therewithin. The end portion 39 of the pump body 11 is provided with a longitudinal opening 40 through which the adjacent end of the rotor shaft 37 is adapted to pass into the pumping chamber 41 of the centrifugal pump 5 for directly supporting the pump impeller 13, such rotor shaft 37 being supported in the opening 40 in the end portion 39 as by means of a sleeve bearing 42. Since the pump impeller 13 is supported by the rotor shaft 37, of course no means whatsoever is needed for coupling the rotor and pump shafts together. Nor is it necessary to provide a common rotating shaft seal between the pump 5 and motor 4, since the stator assembly 20 is completely sealed between the inner and outer stainless steel liners 21 and 22.

On occasion it will become necessary to service or replace either the pump 5 or motor 4 or both. Accordingly, it is desirable that it be possible to disassemble the two-part housing 2, 3 for easy access to the interior thereof. In the preferred form of the present invention, this is accomplished by providing annular tapered flanges 45 and 46 on the adjacent ends of the respective housing parts 2 and 3 and a two-part clamping ring 47, 48 having an inner annular groove 49 the side walls of which have tapers complemental to the tapers of the flanges 45 and 46 on the housing parts 2 and 3. Thus, when the screws 51 (see FIG. 2) are tightened to draw the clamping ring parts 47 and 48 together, the complemental side walls of the ring parts 47 and 48 will wedge the flanges 45 and 46 of the housing parts 2 and 3 into tight clamping engagement. Of course, although not shown, a gasket may be provided between the adjacent surfaces of the flanges 45 and 46 to provide a more effective seal, if desired.

In FIGS. 3 and 4 there is illustrated another form of the present invention. Although the principles of operation and the advantages of the pump motor construction 60 of the FIG. 3 embodiment are substantially the same as the FIG. 1 embodiment, the structure thereof is somewhat different. For example, the motor 62 is clamped directly to the housing 63 of the pump 61 by a suitable clamping ring 64, such clamping ring 64 desirably being in contact with the outturned lip 65 of the outer liner 66 for the motor 62 and threadedly engaging the outer surface of the pump housing 63, whereby upon tightening of the clamping ring 64, the motor 62 is drawn into fluid tight engagement with the pump 61. Of course, the motor 62 could have a housing around the outer liner 66 which would then be clamped to the pump housing 63 by the clamping ring 64, rather than the outer liner 66, if desired.

Moreover, the manner in which the stator assembly 68 of the motor 62 is hermetically sealed is slightly different than the manner in which the stator assembly 20 of the motor 4 is sealed. As clearly shown in FIG. 3, the stator assembly 68 is provided with an outer cup-shaped liner 66 and an inner cylindrical liner 69, with the space between such inner and outer liners 69 and 66 not occupied by the stator laminations 70 and stator windings 71 being filled with an epoxy resin. Adjacent the inner surface of the base 72 of the outer liner 66 there is disposed a cylindrical cap member 73 having a peripheral, axially outwardly extending flange 74 which is welded to the inner liner 69 to preclude moisture from passing from the annular chamber 75 into contact with the stator assembly 68. The stator assembly leads 76 extend through an aperture in the adjacent wall of the outer liner 66, and a rubber grommet 77 or the like is disposed thereabout to prevent moisture from seeping in through such opening.

The annular chamber 75 is adapted to receive a rotor 80 and rotor shaft 81, such rotor shaft 81 having a sleeve 82 supported within the bore of the rotor 80.

The pump housing 63 has a fluid inlet 83 and a fluid outlet 84, both of which communicate with an internal fluid chamber 85. The body 86 of the pump 61 is suitably secured to the inner end of the pump housing 63 and is provided with stepped concentric end portions 87 and 88 extending into the annular chamber 75 of the motor 62. The end portion 87 is of a diameter slightly less than the inner diameter of the liner 69 for sliding receipt therein, while the end portion 88 has a diameter slightly less than the diameter of a counterbore 90 in the adjacent end of the sleeve 82 for ready receipt therein. The pump body 86 is also provided with a plurality of longitudinally extending passageways 95 leading from the pumping chamber 85 through the end portion 87 to the annular chamber 75 within the inner liner 69, for the passage of fluid from the pumping chamber 85 into the annular chamber 75 to provide lubrication for the moving parts of the rotor 80 and rotor shaft 81.

To prevent fluid from passing into the stator assembly 68 between the end portion 87 of the pump body 86 and the inner liner 69, an O-ring 96 is disposed between the adjacent surfaces thereof.

The rotor shaft 81 extends through a longitudinal bore 97 in the pump body 86 into the pumping chamber 85 for support of the pump impeller 98. Accordingly, the pump motor construction 60 of the FIG. 3 embodiment, like the pump motor construction 1 of the FIG. 1 embodiment, does not require a special coupling to connect the motor 62 to the pump 61. Nor does the pump motor construction 60 require a seal between the motor 62 and pump 61, since the stator assembly 68 is completely sealed off by the inner and outer liners 69 and 66, the weld 74 between the inner liner 69 and cap member 73, and the O-ring 96 between the pump body 86 and inner liner 69.

Moreover, the pump motor construction 60 of the FIG. 3 embodiment, like the pump motor construction 1 of the FIG. 1 embodiment, can readily be disassembled as by unscrewing the clamp ring 64 when it is necessary to remove the motor due to failure. As a matter of fact, the motor can be removed without disturbing any of the fluid passageways through which the fluid is pumped.

From the above discussion, it should now readily be apparent that it is a simple matter to remove the motors 4, 62 of both of the disclosed forms of pump motor constructions to repair the same in case of failure. Moreover, the number of parts required for the motors 4, 62 have been reduced to a minimum, thus making the motors essentially a throw-away item. Accordingly, should there be a failure in one of the motors, it is generally less costly merely to remove and replace the motor with a new one, rather than attempt to repair the same.

Other modes of applying the principles of the invention may be employed, change being made as regards the details described, provided the features stated in any of the following claims or the equivalent of such be employed.

I therefore particularly point out and distinctly claim as my invention:

1. In combination, a fluid pump and an electric motor for driving said pump, said pump and motor being concentrically disposed in a two-part housing in spaced relation to define with said two-part housing an annular fluid chamber, said pump comprising a body portion which defines with said pump housing part a pumping chamber; a fluid inlet in said pump housing part in fluid communication with said pumping chamber; radially extending passageways in said pump body communicating said pumping chamber with said annular fluid chamber; a fluid outlet in said motor housing part in fluid communication with said annular fluid chamber; means in said pumping chamber for pumping fluid into and out of said pumping chamber through said fluid inlet, radial passageways, annular fluid chamber, and outlet; means operatively connecting said motor to said pumping means for driving the same; and clamping ring means for clamping said housing parts in fluid tight engagement; said motor including a hermetically sealed stator assembly and a rotor and rotor shaft concentrically mounted in the bore of said stator assembly.

2. In combination, a fluid pump and an electric motor for driving said pump, said pump having fluid inlet and outlet connections, a pumping chamber in fluid communication with said inlet and outlet, and means in said pumping chamber for pumping fluid into and out of said pumping chamber through said inlet and outlet; means operatively connecting said motor to said pumping means for driving the same; clamping ring means for clamping said pump and motor in fluid tight engagement, whereby said motor may readily be removed in case of failure without disturbing said connections; said motor comprising a hermetically sealed stator assembly and a rotor and rotor shaft concentrically mounted in the bore of said stator assembly, said rotor shaft extending into said pumping chamber for mounting of said pumping means thereon; an outer liner surrounding said stator assembly and an inner liner disposed in the bore of said stator assembly, both of said liners being cup-shaped; a portion of the body of said pump extending into the open end of said inner liner and supporting said rotor shaft concentrically within said stator bore; openings in said body portion communicating said pumping chamber with said stator bore for the passage of fluid for lubrication of said rotor and rotor shaft; said rotor shaft being supported by a sleeve member in said rotor, said sleeve member having a counterbore therein for receipt of a reduced diameter portion projecting axially inwardly from said body portion, said reduced diameter portion and body portion having an axial bore for receipt of said rotor shaft.

3. In combination, a fluid pump and an electric motor for driving said pump, said pump having fluid inlet and outlet connections, a pumping chamber in fluid communication with said inlet and outlet, and means in said pumping chamber for pumping fluid into and out of said pumping chamber through said inlet and outlet; means operatively connecting said motor to said pumping means for driving the same; said motor comprising a hermetically sealed stator assembly and a rotor and rotor shaft concentrically mounted in the bore of said stator assembly, a sleeve member for supporting said rotor shaft in said rotor, said sleeve member having a counterbore in the pump end; said pump including a body portion having a reduced diameter portion which projects axially inwardly from said body portion for receipt in said counterbore, said reduced diameter portion and body portion having coaxial bores in which said rotor shaft is supported for concentrically locating said rotor in said stator bore.

4. In combination, a fluid pump and an electric motor for driving said pump, said pump having fluid inlet and outlet connections and a pumping chamber in fluid communication with said inlet and outlet, said motor comprising a hermetically sealed stator assembly, an inner liner fixed in the bore of said stator assembly, and a rotor and rotor shaft concentrically mounted in the bore of said stator assembly, said pump including a body portion slidably received in one end of said inner liner for accurately aligning said pump and motor, said body portion having an axial bore therein through which said rotor shaft extends for supporting said rotor shaft and rotor concentrically within said stator bore, said rotor shaft extending through said axial bore in said pump body portion into said pumping chamber, and a pump impeller in said pumping chamber mounted on said rotor shaft which when driven is effective to pump fluid into and out of said pumping chamber through said inlet and outlet.

5. The pump and motor combination of claim 4 further comprising a bearing in said axial bore in said pump body portion through which said rotor shaft extends for supporting said rotor shaft.

6. In combination, a fluid pump and an electric motor for driving said pump, said pump having fluid inlet and outlet connections, a pumping chamber in fluid communication with said inlet and outlet, a stator assembly, and a rotor and rotor shaft concentrically mounted in the bore of said stator assembly, an inner one-piece cup-shaped liner disposed in the bore of said stator assembly, the closed end of said inner liner being impervious, and an outer one-piece cup-shaped liner surrounding said stator assembly, said inner liner having an integral radially outwardly extending flange at its open end adjacent one end of said stator assembly in contact with the lip of said outer liner and welded thereto to preclude moisture from seeping between said liners.

7. In combination, a fluid pump and an electric motor for driving said pump, said pump having fluid inlet and outlet connections and a pumping chamber in fluid communication with said inlet and outlet, said motor comprising a hermetically sealed stator assembly and a rotor and rotor shaft concentrically mounted in the bore of said stator assembly, said pump including a body portion having an opening therein through which said rotor shaft extends for supporting said rotor shaft and rotor concentrically within said stator bore, said rotor shaft extending into said pumping chamber, a pump impeller in said pumping chamber mounted on said rotor shaft which when driven is effective to pump fluid into and out of said pumping chamber through said inlet and outlet, a one-piece cup-shaped inner liner disposed in the bore of said stator assembly and having an open end into which said pump body is slidably received for accurately aligning said pump and motor, and a closed end which is impervious, and an outer one-piece cup-shaped liner surrounding said stator assembly, said inner liner having an integral radially outwardly extending flange in contact with the lip of said outer liner and welded thereto to preclude moisture from seeping between said liners.

8. The pump and motor combination of claim 7 wherein the space between said inner and outer liners not occupied by said stator assembly is filled with a resin bonded sand.

References Cited
UNITED STATES PATENTS

| | | | |
|---|---|---|---|
| 1,974,183 | 9/1934 | Gunderson | 103—87 |
| 2,435,108 | 1/1948 | Toubory | 230—58 |
| 2,485,408 | 10/1949 | Pezzillo | 103—87 |
| 2,741,990 | 4/1956 | White | 103—87 |
| 2,875,694 | 3/1959 | Carter | 103—87 |
| 2,925,041 | 2/1960 | Sigmund | 103—87 |
| 2,986,095 | 5/1961 | Namur | 103—87 X |
| 3,162,128 | 12/1964 | Horlen | 103—87 X |
| 3,220,349 | 11/1965 | White | 103—87 |

FOREIGN PATENTS
284,177  11/1952  Switzerland.

ROBERT M. WALKER, *Primary Examiner.*